United States Patent [19]
Jones et al.

[11] 3,812,574
[45] May 28, 1974

[54] APPARATUS FOR PROCESSING THE TROCHOIDAL HOUSING SURFACES OF ROTARY PISTON MECHANISMS

[75] Inventors: Charles Jones, Hillsdale, N.J.; Alexander H. Raye, Wellsville, N.Y.

[73] Assignee: Curtiss-Wright Corporation, Wood-Ridge, N.J.

[22] Filed: Mar. 2, 1972

[21] Appl. No.: 231,119

[52] U.S. Cl. ................... 29/560, 74/22 R, 51/34 H, 51/DIG. 32, 90/20, 90/30, 148/150, 148/153
[51] Int. Cl. ............................................ B23p 23/04
[58] Field of Search ............ 90/20, 30; 51/91, 50 R, 51/34 H, 110 R, 32; 82/18; 269/57, 58, 71; 74/22 R; 29/560; 148/150, 153, 155

[56] References Cited
UNITED STATES PATENTS

| | | | |
|---|---|---|---|
| 3,663,188 | 5/1972 | Hoglund | 51/101 R |
| 3,693,297 | 9/1972 | Cann | 51/101 R |

FOREIGN PATENTS OR APPLICATIONS

| | | | |
|---|---|---|---|
| 1,117,569 | 6/1968 | Great Britain | 51/110 R |

*Primary Examiner*—Francis S. Husar
*Attorney, Agent, or Firm*—Arthur Frederick

[57] ABSTRACT

The apparatus has a frame and a shaft having eccentric portions journalled for rotation on the frame. A housing support element for a trochoidal housing member to be treated is mounted for rotation on said shaft to rotatively carry the housing member in a path about the shaft. A tool holder is fixedly secured to the frame to support a tool adjacent the trochoid surface of the housing member. A drive means is provided to rotate the housing member and shaft relative to the tool holder and tool in a constant perpendicular spaced relation to the trochoid surface and at a controlled velocity.

11 Claims, 10 Drawing Figures

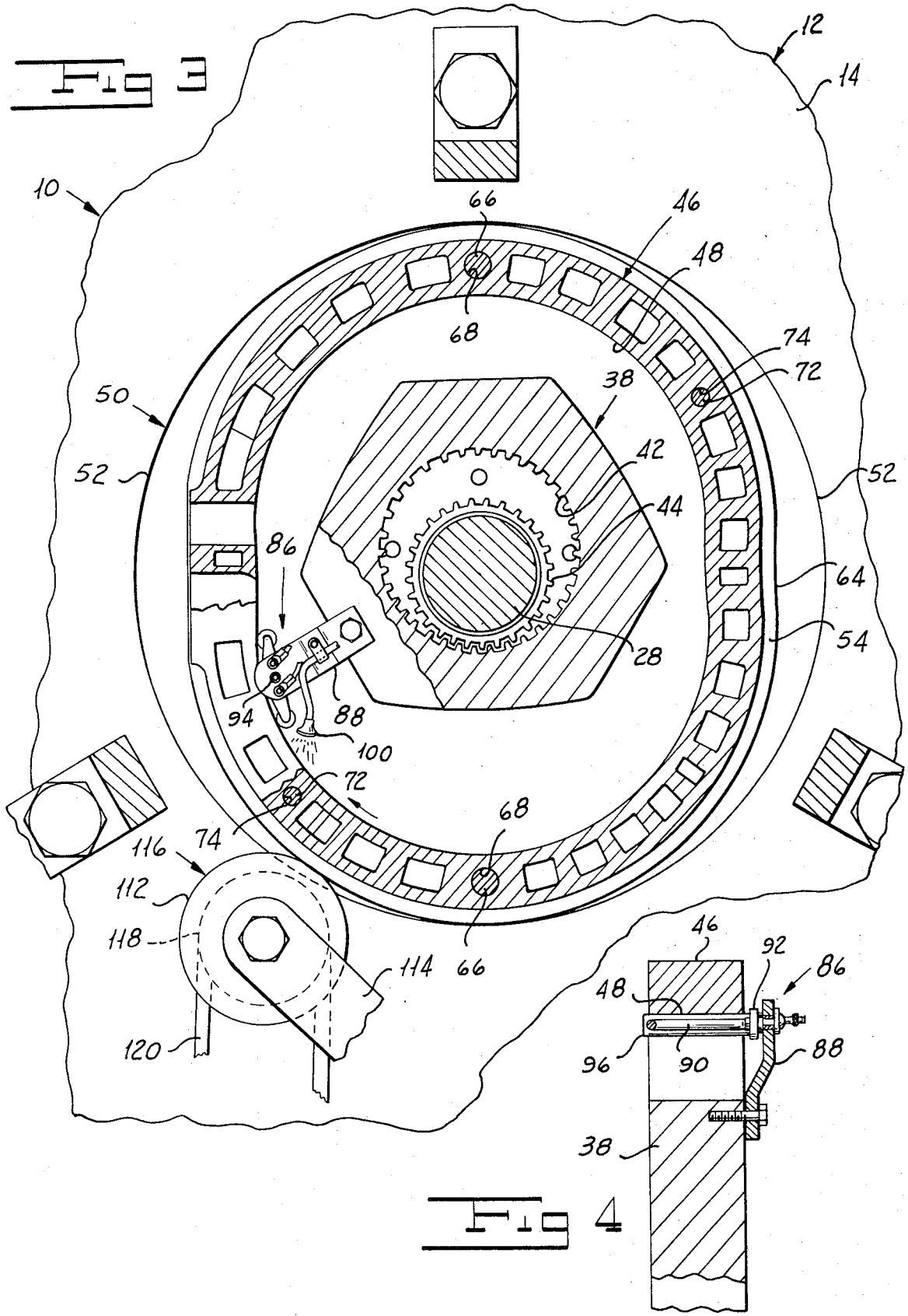

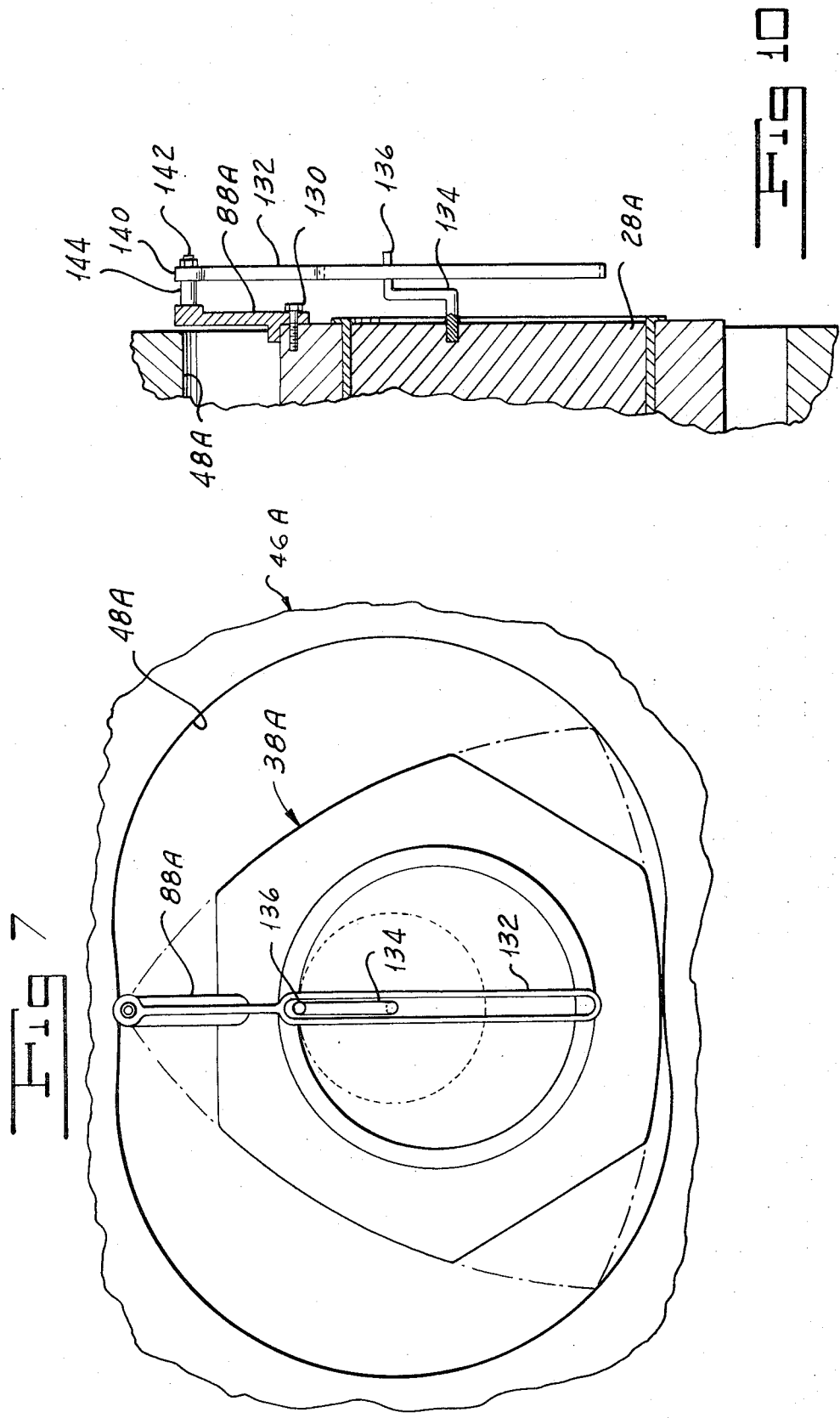

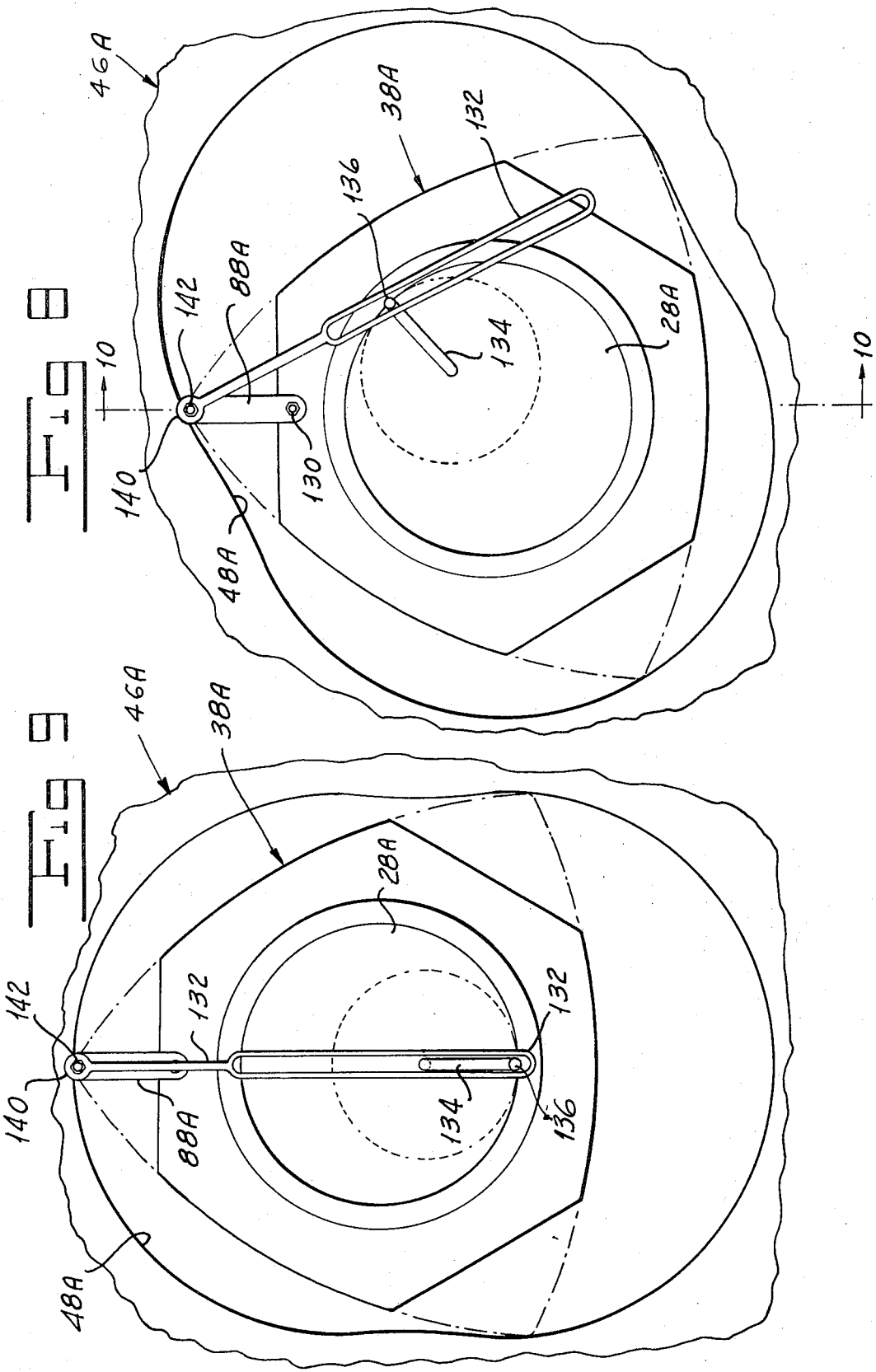

APPARATUS FOR PROCESSING THE TROCHOIDAL HOUSING SURFACES OF ROTARY PISTON MECHANISMS

This invention relates to metal working or treating apparatuses, and more particularly to an apparatus for working or treating the trochoidal shaped housing surfaces of rotary piston mechanisms.

In the fabrication of the housings of the rotary piston mechanism of the type disclosed in the U.S. Pat. No. to Wankel et al., 2,988,065, it is desirable to provide the trochoid surface of the housings with a wear resistant coating, such as tungsten carbide, tungsten cobalt or titanium carbide, or a compound known as Elnisil and Nikasil (SiC Ni). Also, the coating materials after their application to the housing may have to be surface finished or ground to a desired dimension. In some fabricating techniques, the trochoid surface of a rotary piston mechanism is hardened by an induction heating and quenching process. Since the trochoid surface is a generated surface of irregular configuration, coating the trochoid surface or otherwise treating such surface presents a complex problem in machine tool design to provide a mechanism which can achieve accurate and uniform application of coating material, surface treating or finishing, the complexity of the problem is exemplified in the U.S. Pat. No. to Baier, 2,870,578. Many complex devices and steps have been devised to treat or machine the trochoid surface of the housing of a rotary piston mechanism, but all have proven either expensive or incapable of achieving accuracy.

Accordingly, it is an object of this invention to provide a processing apparatus for processing the trochoid surfaces of the housings of rotary piston mechanisms which apparatus is relatively simple and inexpensive to fabricate and yet is capable of coating, treating or finishing the trochoid surface of a rotary piston mechanism.

Another object of the present invention is to provide a processing apparatus for processing the trochoid surfaces of the housings of rotary piston mechanisms, which apparatus is capable of maintaining a constant dimensional relation between the surface to be treated and a treating or working implement or tool and providing a controlled relative velocity between the tool and the surface to be treated.

A further object of this invention is to provide a processing apparatus for processing the trochoid surfaces of the housing units of rotary piston mechanisms wherein housing units to be treated can be quickly and easily mounted on and removed from the apparatus.

SUMMARY OF THE INVENTION

The present invention therefore contemplates a processing apparatus for treating or working the trochoid surfaces of housing units of rotary piston mechanism which apparatus comprises a frame and a shaft having eccentric portions journalled for rotation on the frame. A housing support element for holding a housing unit having a trochoidal surface to be treated is mounted on the shaft for rotation relative to the latter. A tool holding means is fixedly secured to the frame. One or more implements or devices for treating and/or working the trochoidal surface of the housing unit (hereinafter referred to as a "tool") are supported by the tool holding means adjacent the trochoid surface of the housing unit. A drive means is provided for rotating the housing support element and the housing unit which is attached to the latter. The drive means comprises a drive wheel means rotated from a suitable source of rotary power and a drive plate means, having a trochoidal shaped driven surface complementary to the trochoid surface to be treated, attached to the housing support element. The drive wheel means is disposed to engage the driven surface to rotatively drive the cam plate means and, simultaneously therewith the housing support element and the shaft relative to the tool holding means. The processing apparatus maintains the tool supported by the tool holding means in constant perpendicular relation to the trochoid surface to be treated or worked, in a constant predetermined spaced relation to the trochoid surface and at a controlled constant relative linear velocity between the tool and housing to be treated to insure uniform treatment or working of the entire trochoid surface. To maintain the desired preselected relationship of the tool holding means to the housing support element and the housing unit mounted thereon, a pinion gear is connected to rotate with the housing support element and disposed eccentrically to and in mesh with an internal gear secured to the tool holding means so that as the housing support element is rotatively driven, the pinion gear rotates and "walks" around the internal gear.

BRIEF DESCRIPTION OF THE DRAWINGS

The invention will be more fully understood from the following detailed description thereof when considered in connection with the accompanying drawings wherein two embodiments of the invention are illustrated by way of example and in which:

FIG. 3 is a view in cross-section taken substantially along line 3—3 of FIG. 2;

FIG. 4 is a fragmentary view in cross-section taken substantially along line 4—4 of FIG. 3;

FIG. 5 is an enlarged fragmentary plan view of a tool support and tool treating device attached thereto on a somewhat enlarged scale;

FIG. 6 is a cross-sectional view taken along line 6—6 of FIG. 5;

FIGS. 7, 8 and 9 are shown various operative positions of a processing apparatus according to another embodiment of this invention; and FIG. 10 is a view in cross-section taken along line 10--10 of FIG. 8.

DESCRIPTION OF PREFERRED EMBODIMENTS

Figure 1:
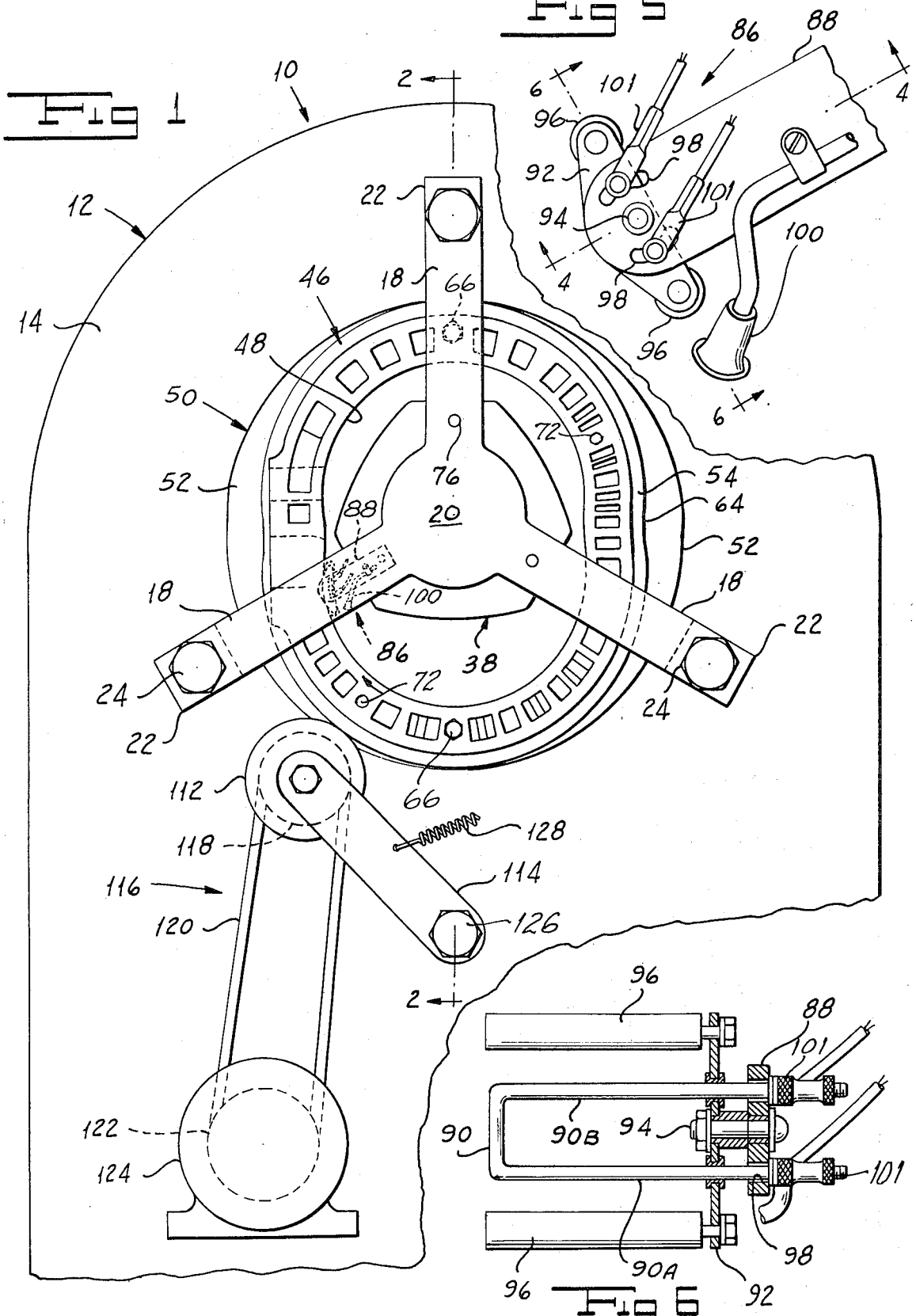
FIG. 1 is an end elevational view of the processing apparatus according to this invention.
Figure 2:
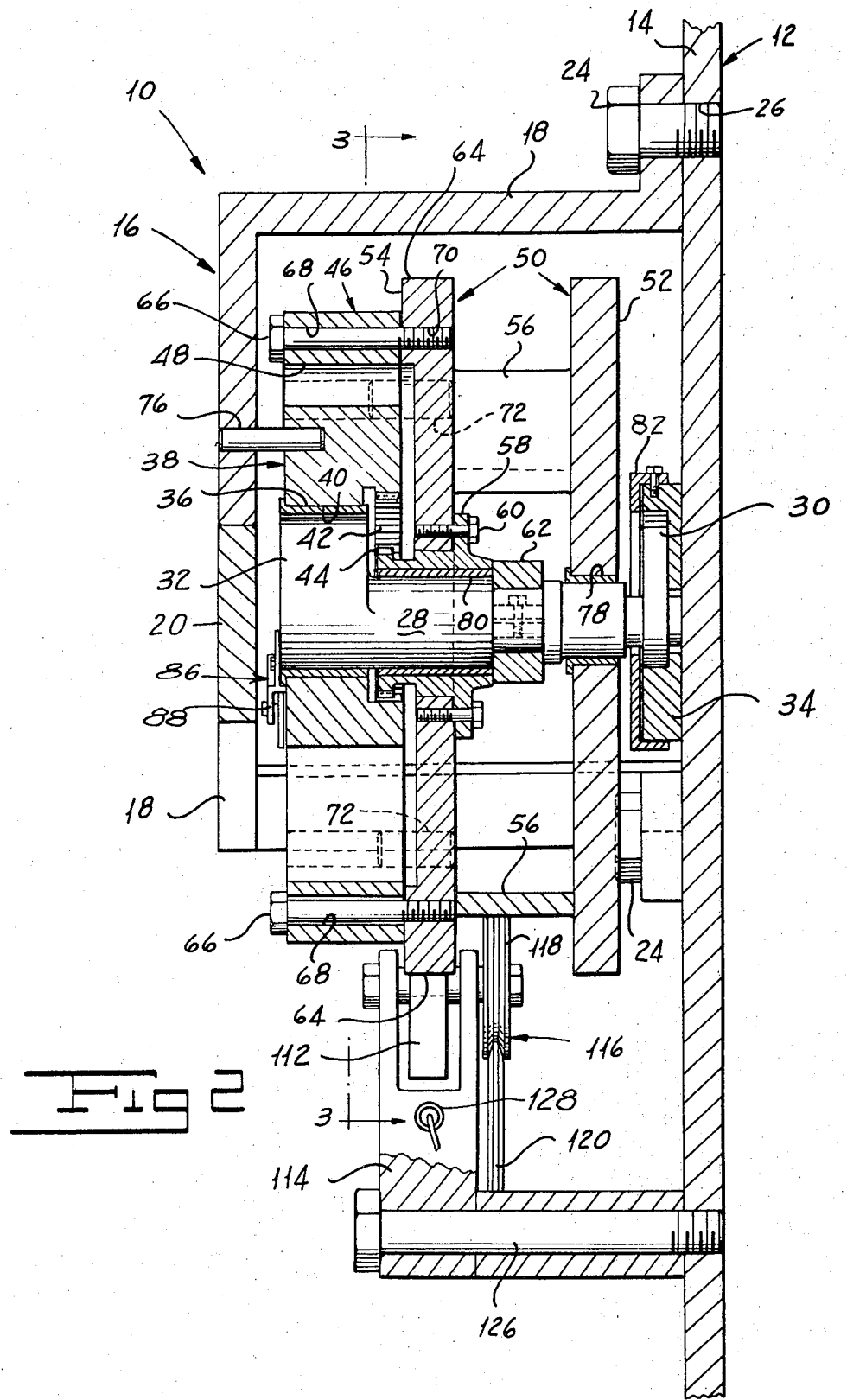
FIG 2 is a cross-sectional view taken substantially along line 2—2 of FIG. 1.

Now referring to the drawings and particularly FIGS. 1 to 3, the reference number 10 generally designates a processing apparatus according to a first embodiment of the invention.

Processing apparatus 10 comprises a frame 12 which is rigidly supported in any suitable manner, such as by base plates or plates anchored in the floor or the like, (not shown). The frame 12 consists of a support plate 14 and spider assembly 16. The spider assembly 16 comprises a plurality of "L" shaped legs 18 extending from a central portion 20. The legs 18 are each secured at one end to central portion 20 and are arranged in circumferential spaced relationship to each other. Each leg 18 has a flanged end portion 22 in which a hole is provided to receive therethrough a mounting bolt 24. Each mounting bolt 24 is turned into a threaded bore 26 in support plate 14 to thereby affix spider assembly 16 to the support plate 12.

A shaft 28, having eccentric portions 30 and 32, is supported for rotation in bearings 34 and 36. The bearing 34 is secured in a suitable manner, such as welding, bolting or the like, to support plate 14. The opposite end of shaft 28 is supported in bearing 36 which is secured in a tool holding means 38, hereinafter referred to as a "tool holder."

The tool holder 38 comprises a body portion having an eccentric bore 40 therethrough, with the bearing 36 for eccentric shaft portion 32 secured in bore 40. To maintain the desired angular relationship of tool holder 38 and shaft 28, an internal gear 42 is provided in or adjacent bore 40 and in mesh with a pinion gear element 44. The internal gear 42 may be formed integral with the tool holder body or can be a separate member secured in any suitable manner to the tool holder body. The tool holder 38 is similar to a rotor or inner body member of a rotary piston engine of the type such as disclosed in the U.S. Pat. No. to Wankel et al, 2,988,065, and differs in one material respect from the conventional rotor in that it is stationary. In accordance with the present invention, a trochoid housing member or unit 46, which has a trochoidal surface 48 to be worked or treated, is rotated relative to tool holder 38 which is a kinematic inversion of the motions achieved by the conventional fixed housing and rotating rotor.

A housing support assembly 50 for receiving and supporting trochoid housing unit 46 is mounted on shaft 28 adjacent tool holder 38. The housing support assembly 50 comprises a plate 52 connected in spaced parallel relationship with a drive plate 54 by circumferentially spaced, spacer ribs 56. The spacer ribs are either welded or in some other suitable manner secured to plates 52 and 54 so that the plates are attached together for rotation in unison. The drive plate 54 has a centrally disposed bore, through which pinion gear element 44 extends and to which plate 54 is attached. The pinion gear element 44 has flange portion 58 which abuts one side of drive plate 54. A plurality of bolts 60 extend through holes in flange portion 58 and into aligned threaded openings in drive plate 54 to thereby secure the cam plate to pinion gear element 44. A split collar 62 is clamped to shaft 28 and in abutment against pinion gear element 44 to secure trochoid housing support assembly 50 in a fixed axial position on shaft 28. As best shown in FIGS. 1 and 3 the peripheral edge of drive plate 54 is contoured to provide a drive surface 64, the trace or profile of which is complementary and parallel to trochoidal surface 48 of trochoid housing unit 46.

As shown, trochoid housing unit 46 may be secured to support assembly 50 by two or more bolts 66 which extend through tie-bolt holes 68 formed in the trochoid housing unit. The bolts 66 are turned into threaded holes 70 in drive plate 54 to draw trochoid housing unit 46 into tight abutment against the cam plate. To properly align the successive trochoid housing units to be worked or treated on housing support assembly 50, one or more pilot pins 72 are secured in drive plate 54 to project at one end from the cam plate surface and into preselected tie bolt holes 74 in the trochoid housing unit 46. The pins 72 are each dimensioned to snugly but axially slidably fit its associated tie bolt hole so that the trochoid housing unit 46 is held against rotative movement relative to drive plate 54.

Also, to insure that tool holder 38 does not rotate, at least one dowel pin 76, carried either by a leg 18 or tool holder 38, extends into aligned holes in leg 18 and tool holder 38.

The gears 42 and 44 are sized (diameter ratio of 3:2) to enforce a 3:1 ratio of angular velocity between shaft 28 and trochoid housing support assembly 50. Since the housing support assembly 50 and shaft 28 rotate relative to each other, sleeve bearings 78 and 80 are carried by plate 52 and pinion gear element 44, respectively. The shaft 28 is held against axial movement to the right as viewed in FIG. 2 by a retainer 82 which is secured to bearing 34. Axial movement of shaft 28 to the right as viewed in FIG. 2 is limited by the end of shaft 28 abutting support plate 14.

As best shown in FIGS. 3, 4, 5 and 6 at least one tool assembly 86 is secured to tool holder 38. While tool assembly 86 is shown and will be described as an induction heating and quenching device, it is to be understood that tool assembly 86 may be of any other suitable type for working or treating trochoidal surface 48, such as an oxy-aceylene gun, plasma spray gun, grinder, cutter or the like. When tool assembly 86 includes a rotary grinder or cutter the spindle axis of such tool is displaced from the point of oscillation of the generated surface by distance equal to the radius of the grinder or cutter.

The tool assembly 86, as an induction heating and quenching device for hardening trochoidal surface 48, includes a bracket 88 which is bolted to tool holder 38 and projects outwardly therefrom to a point adjacent the imaginary apex formed by projection from the sides of tool holder 38. A U-shaped, high frequency current, induction coil 90 is supported in an articulating plate 92 to extend in a plane normal to the plane of bracket 88. The plate 92 is pivotally connected to bracket 88 by a pin 94. The plate 92 also carries a pair of rollers 96, each one of which is disposed parallel to and on one side of coil 90. Each of the legs 90A and 90B of coil 90 extend through an arcuate slot 98 in bracket 88 to permit pivotal movement of coil 90 relative to the bracket. The ends of legs 90A and 90B are connected to electrical terminals 101 by means, such as terminal nuts 102 turned upon the threaded end portions of legs 90A and 90B. The electrical terminals are connected to a suitable source of electric current (not shown), such as a conventional high frequency current generator, the coil effecting a heating of the trochoidal surface to very high temperatures, such as 2,000°F. To insure that the entire width of trochoidal surface 48 is treated, drive plate 54 is provided with a recess 55 in the face adjacent trochoid housing unit 46 so that coil 90 is permitted to extend the full width of trochoidal surface 48.

Also forming part of the tool assembly 86 is a quenching means which consists of a spray nozzle 100 and a supply conduit 102. The supply conduit 102 communicates spray nozzle 100 with a source (not shown) of cooling fluid, such as water, so that cooling fluid discharges from nozzle 100. The spray nozzle 100 is positioned in trailing relationship to coil 90 so that the spray of cooling fluid discharged from the nozzle impinges trochoidal surface 48 after the latter has been heated by coil 90. To effect quench cooling of the trochoidal surface at the proper time a valve or other control means (not shown) is provided to control flow of cooling fluid from spray nozzle 100.

The tool assembly 86 is positioned so that rollers 96 engage trochoidal surface 48 thereby insuring the maintenance of coil 90 in close spaced, parallel relation to trochoidal surface 48 and, as will be explained hereinafter, coil 90 follows a line substantially complementary to the trace or profile of the trochoid as trochoid housing unit 46 rotates relative to the tool assembly 86.

As shown in FIGS. 1 and 2, trochoid housing unit 46 and the housing support assembly 50 are rotatively driven by a drive means which comprises in addition to drive surface 64 of drive plate 54, a drive wheel 112 which is supported in a bifurcated bracket 114 and in contact with drive surface 64. The drive wheel 112 is rotatively driven by a suitable source of rotary power which may be, as shown, a pulley and belt drive assembly 116.

The pulley and belt drive assembly 116, consists of a driven pulley wheel 118 mounted on and connected to rotate the same shaft to which drive wheel 112 is connected. The driven pulley wheel 118 is connected, through a belt 120, to a drive pulley wheel 122, which is rotated by a motor 124 (see FIG. 1). The motor, of course, may be of any suitable electric, hydraulic or pneumatic type. The bracket 114 is pivotally connected to support plate 14 by a bolt 126 and is biased by a spring 128. The spring 128 functions to force and maintain drive wheel 112 in engagement with drive surface 64.

While drive wheel 112 frictionally engages drive surface 64 to rotate the latter, it is within the scope and spirit of the invention to effect transmission of rotation between drive wheel 112 and drive surface 64 in a positive manner such as by providing those members with meshing gear teeth.

In operation of processing apparatus 10, motor 124 rotates drive wheel 112 through pulley wheels 122 and 118 and belt 120. Substantially simultaneously therewith, high frequency current is supplied, from a suitable source thereof (not shown), to coil 90. The trochoid housing support assembly 50 is rotated through the rotation of drive wheel 112 and its engagement with drive surface 64 of drive plate 54. The rotation of assembly 50 and its cam plate 54 carries trochoid housing unit 46 in a rotative path about tool holder 38 and thereby causes trochoid surface 48 to move past coil 90 and spray nozzle 100. By rotating trochoid housing unit 46, through drive wheel 112 and cam surface 64, at a constant RPM, a constant relative linear velocity is maintained between the tool assembly 86 and the adjacent trochoidal surface 48. This constant relative linear velocity is of particular importance where tool assembly 86 is a grinder or other rotary cutter and uniform removal of surface material is desired.

After completion of the working or treatment of trochoidal surface 46, trochoid housing unit 48 is removed by disconnecting spider support assembly 16 from support plate 12. This disconnection is achieved by removal of bolts 24. Thereafter, bolts 66 are removed from drive plate 54, thus freeing trochoidal housing unit 46 for removal and replacement by another trochoid housing unit 46 to be treated or worked. The new trochoid housing unit 48 is connected to trochoid housing support assembly 50 by placing trochoid housing unit 46 in abutment against the face of cam plate 54, the trochoid housing unit 46 being properly orientated relative to cam plate 54 by guide pins 72. Bolts 66 are then inserted through tie-bolt holes 68 and turned into threaded bores 70 to thereby secure the trochoid housing unit 46 to support assembly 50. Thereafter, spider assembly 16 is reconnected to support plate 14 by bolts 24 and tool holder 38 by one or more pins 76. The trochoid housing support assembly 50 and shaft 28 are rotatatively driven about tool holder 38 as herein previously described.

ALTERNATIVE EMBODIMENT

In FIGS. 7 to 10, inclusive, is shown another embodiment of the invention wherein a tool holder assembly 86A is maintained in a substantially perpendicular relationship to the trochoidal surface 48A as the latter rotates relative to a tool holder assembly 86A. The parts of the embodiment shown in FIGS. 7 to 10 corresponding to like parts of processing apparatus 10 will be designated by the same reference number having a suffix A added thereto.

As illustrated in FIGS. 7 and 8, tool holder 86A comprises a slider and crank mechanism which consists of a bracket 88A secured by a bolt 130 to tool holder 38A, a slotted arm or link 132 and a crank pin 134 which is secured at one end to the end of shaft 28A and rides at the opposite end 136 within the slot 138 of link 132. The link 132 is connected at its one end 140 to a tool holder shaft 142 which is pivotally secured in bracket 88A and is adapted to carry a tool (not shown). A spacer 144 may be interposed between bracket 88A and link 132 to support the latter in spaced relation to bracket 88A and shaft 28A. Since link 132 is connected to tool holder shaft 142, pivotal movement of link 132 will effect rotary movement of shaft 142 and a tool (not shown) which is connected to the shaft.

In FIGS. 7, 9 and 10 wherein two extreme operative positions and an intermediate operative position of tool holder assembly 86A are shown, relative rotation of trochoid housing support (not shown) and the trochoid housing unit 46A held by the latter, tool holder 38A, and shaft 28A results in oscillatory movement. This oscillatory movement is achieved by crankpin 134 as it is carried in a circle by shaft 28A relative to tool holder 38A and is automatically timed to maintain tool holder shaft 142 always in the same relationship to trochoidal surface 48A. The ability to provide this constant positional relationship along with a constant relative linear speed, permits the tool (not shown) carried by tool holder shaft 142 to uniformaly treat or work trochoidal surface 48A. Tool holder assembly 86A may be provided with a suitable means (not shown) for linearly indexing the tool holder shaft 142 to compensate for wear of the tool, particularly where the tool is a rotary grinding wheel or the like.

It is now believed readily apparent that the present invention provides a processing apparatus for processing the trochoid surfaces of rotary piston mechanism housings, which apparatus is capable of maintaining a tool or treating implement in substantially uniform predetermined spatial relationship to the trochoidal surface to be worked or treated and also carry that tool at a substantially constant linear velocity relative to the trochoidal surface. It is a processing apparatus that utilizes the same relative rotative movement between the rotor and housing of a rotary piston mechanism so that a tool or implement is carried in a path substantially parallel to trace the generated trochoidal surface.

Although two embodiments of the invention have been illustrated and described in detail, it is to be expressly understood that the invention is not limited thereto. Various changes can be made in the arrangement of parts without departing from the scope and spirit of the invention, as the same will now be understood by those skilled in the art. For example, in place of bolts 66 for securing trochoid housing unit 46 to support assembly 50, a suitable clamping means for quickly grasping, holding and releasing trochoid housing units may be employed in place of bolts 66.

What is claimed is:

1. A processing apparatus for working or treating the trochoidal surface of the trochoid housing unit of a rotary piston mechanism comprising:
   a. a frame;
   b. a tool holding means fixedly secured to said frame and having at least one surface working or treating implement;
   c. a shaft having eccentric portions journalled at said eccentric portions to said frame and tool holding means;
   d. a housing support means mounted on said shaft adjacent the tool holding means mounted for rotation relative to the latter and the shaft;
   e. said housing support means includes a means for holding the trochoid housing unit having a trochoidal surface to be treated in a position encompassing the tool holding means; and
   f. rotary drive means for rotating the housing support means in a path substantially parallel and complementary to the trace of the generated trochoidal surface of trochoid housing unit so that the trochoidal surface of said trochoid housing unit moves relative to the tool holding means and the surface working implement.

2. The apparatus of claim 1 wherein the rotary drive means, includes a driven surface associated with the housing support means and coacting with a drive member to rotate the trochoid housing unit relative to the tool holding means and working or treating implement at a constant relative linear velocity adjacent the working implement.

3. The apparatus of claim 2 wherein said driven surface has a configuration substantially parallel and complementary to the trochoidal surface of the trochoid housing unit.

4. The apparatus of claim 3 wherein said driven surface is a peripheral surface of a drive plate attached to the housing support means for conjoined rotation with the latter.

5. The apparatus of claim 1 wherein the working surface of the working implement is positioned at a point on a line normal to the track or trace of the trochoidal surface of housing support means.

6. The apparatus of claim 1 wherein said rotary drive means includes a driving means rotatively driven by a source of rotary power and a driven means connected to the housing support means and in engagement with the driving means to be rotatively driven by the latter.

7. The apparatus of claim 6 wherein said driving means has a configuration substantially parallel and complementary to the trochoidal surface of the trochoid housing unit.

8. The apparatus of claim 1 wherein gear means is provided to maintain said housing support means in a predetermined angular relationship with the tool holding means.

9. The apparatus of claim 1 wherein said tool holding means has a body portion and a working implement mounted on the body portion so as to maintain a constant predetermined spaced relation to the trochoidal surface as the latter moves in a path relative to the working implement.

10. The apparatus of claim 6 wherein said driving means is a wheel engaging the driven means to frictionally drive the latter.

11. The apparatus of claim 10 wherein a biasing means is provided to urge the driving and driven means together.

* * * * *

UNITED STATES PATENT OFFICE
CERTIFICATE OF CORRECTION

Patent No. 3,812,574            Dated May 28, 1974

Inventor(s) Charles Jones and Alexander H. Raye

It is certified that error appears in the above-identified patent and that said Letters Patent are hereby corrected as shown below:

IN THE SPECIFICATION:

Column 2, line 8, the word "cam" should read --drive--.
Column 3, line 47, the word "cam" should read --drive--.
          line 61, the word "cam" should read --drive--.
Column 5, line 46, the word "cam" should read --drive--.
          line 50, the word "cam" should read --drive--.
          line 58, the numerals "46" and "48" should be interchanged.
          line 65, the numeral "48" should read --46--.
          line 67, the word "cam" should read --drive--.
Column 6, line 2, the word "cam" should read --drive--.

Signed and sealed this 8th day of October 1974.

(SEAL)
Attest:

McCOY M. GIBSON JR.
Attesting Officer

C. MARSHALL DANN
Commissioner of Patents